United States Patent [19]

Bezerie et al.

[11] 3,939,342
[45] Feb. 17, 1976

[54] DEVICE FOR MEASURING AN ANGULAR DEVIATION BY HETERODYNE DETECTION

[75] Inventors: Jean Pierre Bezerie, Ville D'Avray; Michel Benoit Sirieix, Jouy-En-Josas, both of France

[73] Assignee: Societe Anonyme de Telecommunications, Paris, France

[22] Filed: Mar. 28, 1974

[21] Appl. No.: 455,529

[30] Foreign Application Priority Data
Apr. 4, 1973 France .................... 73.12068

[52] U.S. Cl. ............. 250/203 R; 250/578; 356/152
[51] Int. Cl.² ........................... G01J 1/20
[58] Field of Search .......... 250/203 R, 233, 578; 356/28, 152; 331/DIG. 1; 343/113 DE

[56] References Cited
UNITED STATES PATENTS

| | | |
|---|---|---|
| 3,409,369 | 11/1968 | Bickel .................... 356/28 |
| 3,497,697 | 2/1970 | Brinkman et al. ........ 250/203 R |
| 3,500,050 | 3/1970 | Hillman ................... 356/28 X |
| 3,698,811 | 10/1972 | Weil ....................... 356/28 X |
| 3,841,755 | 10/1974 | Debart .................... 356/28 |

Primary Examiner—Walter Stolwein

[57] ABSTRACT

A device for measuring an angular deviation by a space-time modulated heterodyne detection comprising a coherent optical radiation transmitter pointed at a target, a local transmitter of a coherent optical radiation having the same wavelength as the preceding radiation, a photovoltaic detector, means for focussing at a point on said detector the radiation reflected by the target, and means for converting the radiation of the local transmitter into a parallel beam and causing said parallel beam to impinge perpendicularly on the surface of said detector, wherein the means for space-time modulating the heterodyne detection are interposed in the path of the radiation from the local transmitter.

6 Claims, 2 Drawing Figures

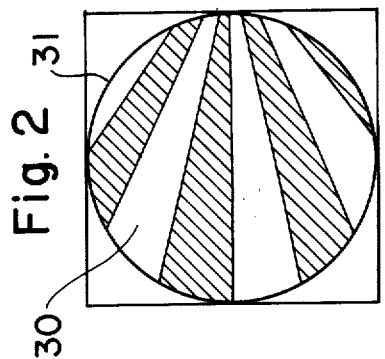
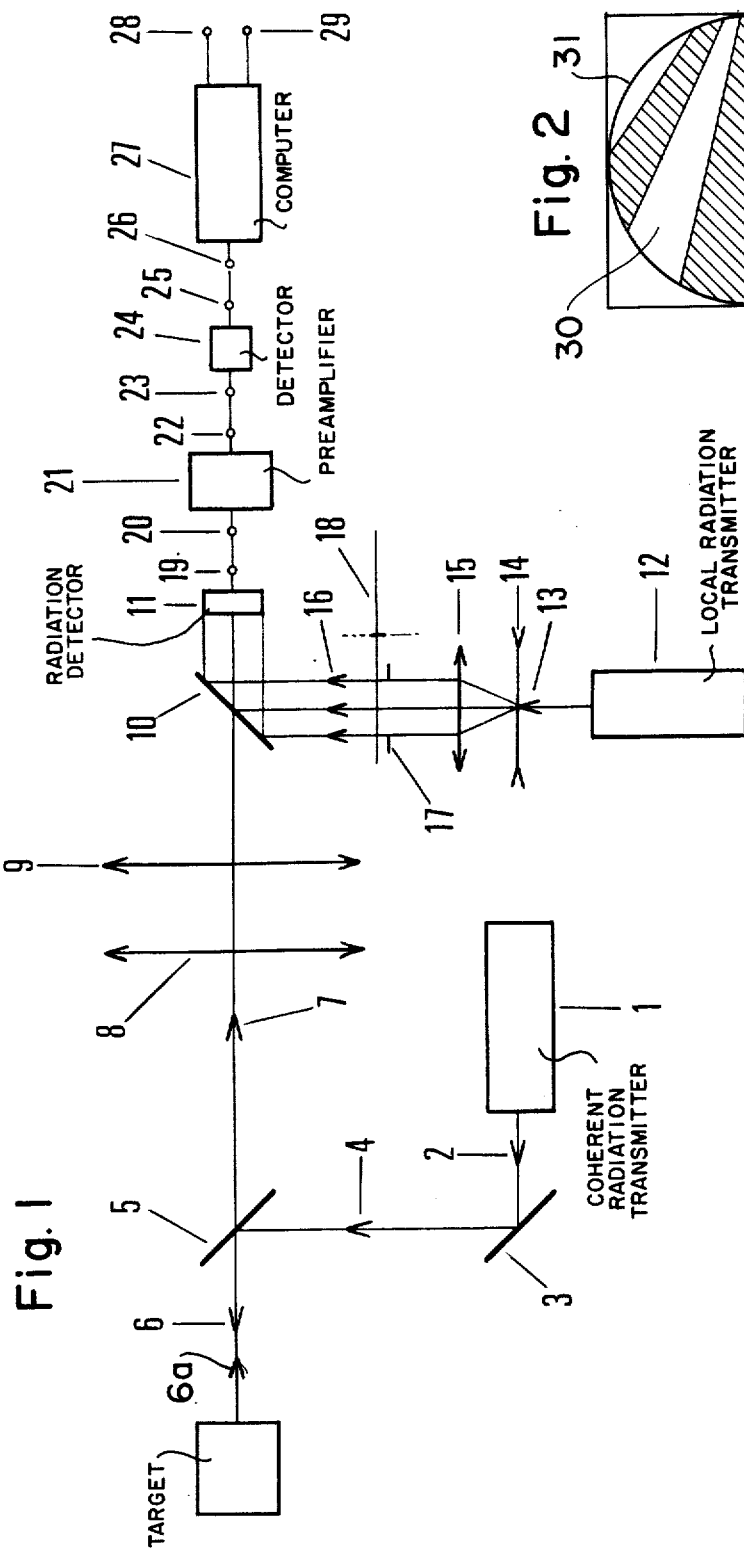

DEVICE FOR MEASURING AN ANGULAR DEVIATION BY HETERODYNE DETECTION

The present invention relates to a device for measuring an angular deviation, or a deviationmeter, employing heterodyne detection.

The heterodyne detector is an apparatus comprising a photovoltaic detector which receives simultaneously a coherent signal radiation beam of small amplitude and frequency $f_1$ and a coherent radiation beam of greater amplitude and frequency $f_2$ coming from a local oscillator usually constituted by a carbonic gas laser. The photovoltaic detector delivers a current which results from the mixture of the two incident radiations with a frequency equal to $f_1-f_2$ and an amplitude which is proportional to the product of the amplitudes of the incident radiations.

Such a heterodyne detector may be employed for following a mobile target with a scanning beam and a local beam having strictly the same wavelength. The frequency of the signal transmitted by the target is modified by the radial velocity of the target by the Doppler effect so that the output signal of the photovoltaic detector contains information on the velocity of the target. The radiation reflected by the target constitutes the signal, the target being previously brought into the field of reception of the photovoltaic detector by direct aiming and manual centering. Although known mechanical aiming devices afford good possibilities of precision, the precision that an analysis effected by scanning can afford is limited and a measurement of the deviation thus achieved does not employ to the full the possibilities of the laser radiation.

Modulation of the incident signal has also been envisaged, for example by causing the beam reflected by the target to undergo a rotation about an axis and by causing the reflected radiation, thus caused to rotate, to impinge on a photovoltaic detector of particular type so that the image of the target, in the course of its rotation in the plane of the detector passes through a detector surface a plurality of times so that the output signal of the photovoltaic detector is modulated as a function of the effective position of the target with respect to the aiming axis. This system has the drawback of requiring means for rotating the beam reflected by the target and is moreover, very sensitive to the actual form of the target. The photovoltaic detector must also have a particular form.

An object of the present invention is to eliminate these drawbacks by means of a device in which the signal beam is not treated, the output signal of the photovoltaic detector being substantially independent of the form of the target.

For this purpose the invention provides a device wherein the means for space-time modulating the heterodyne detection are interposed in the path of the radiation from the local transmitter. Preferably, this modulation is such that it affords, after heterodyne detection, a frequency-modulated video signal.

The space-time modulating means may be mechanical, electro-optical, acousto-optical. There may also be employed a modulation of the transverse modes of the local emitter. In the case of mechanical means, there is preferably employed a grid formed by alternately transparent and opaque sectors which undergo a circular movement of translation.

As the production of the output signal by the photovoltaic detector requires the simultaneous presence of the incident signal and the local beam the modulation of the latter permits a precise modulation of the signal received by the photovoltaic detector, with no need to give to the detector a particular form.

The device according to the invention may be employed in association with appropriate systems of electromechanical means to which the output signal of the detector is transmitted to perform the tasks of observation, plotting, and automatic aiming on rapid mobile targets, these targets being cooperative or, on the contrary, passive etc. . . .

The invention will be understood from the ensuing description with reference to the accompanying drawings in which:

FIG. 1 is a diagram of the principle of one embodiment of the device according to the invention;

FIG. 2 represents the superimposition, in the plane of the detector, of the two radiations received simultaneously in respect of the device shown in FIG. 1.

In the illustrated embodiment, a first coherent radiation transmitter 1 transmits a radiation 2 which is reflected on a planar mirror 3. The reflected radiation 4 encounters a semi-reflecting surface 5 which allows through a part of said radiation 4 and reflects the other part thus forming the radiation 6 which is directed toward the mobile target (not shown). Upon contact with suitable reflectors placed on the target, the radiation 6 is reflected onto itself and returns 6a to impinge on the semi-reflecting mirror 5. The useful part of this reflected radiation is that which passes through the mirror 5 and is propagated in the beam 7 through optical elements 8 and 9 and a semi-reflecting mirror 10 to a radiation detector 11. The optical elements 8 and 9 are such that the radiation reflected on the mobile target is focussed at a single point in the plane of the surface of the detector. The radiation detector 11 also receives on its sensitive surface the radiation transmitted by a local radiation transmitter 12. The latter transmits a radiation 13 which has a wavelength strictly identical to the wavelength of the radiation transmitted by the transmitter 1, this being for example easily obtained by known means and in particular those described in French Pat. No. 2,070,473. The transmitted radiation 13 passes through optical elements 14 and 15 which are such that said radiation is converted into a beam of parallel rays 16. This beam of parallel rays encounters in succession a diaphragm 17, a modulator 18 and the semi-transparent mirror 10 which reflects the useful part of said beam 16 onto the sensitive surface of the radiation detector 11.

In the plane of the surface of the detector 11 the radiations received are as shown in FIG. 2. In this Figure, the radiation reflected on the mobile target is represented by the spot 30 and the radiation transmitted by the local transmitter 12 is defined by the image 31 of the diaphragm 17. Within this image 31 there is reproduced, at a given instant, the image of the portion of the modulator 18 located in the path of the radiation beam 16. This modulator is of a well-known type comprising sectors which are alternately transparent and opaque to said radiation and undergo a circular movement of translation.

Owing to the speed of displacement of the mobile target, the laser beam which impinges on the sensitive surface after having been reflected on the mobile target, has acquired by the Doppler effect a new frequency $f_2$ which is different from the frequency $f_1$ of transmission common to the two generators 1 and 12. In the region in which the image 30 of the target is formed on the sensitive surface of the element 11 there is produced, solely when this region simultaneously receives the flux of the local laser, a frequency change which has for result to produce a signal of frequency $f_1$-$f_2$. This frequency $f_1$-$f_2$ is a function of the radial velocity of the target and may reach high values. By way of example, if the mobile target is constituted by a jet aircraft viewed from the front, the frequency $f_1$-$f_2$ may reach 70 MHz by employing as generators 1 and 12 laser transmitters whose radiation is constituted by coherent waves of 10.6 microns.

This signal of frequency $f_1$-$f_2$ is received at the output terminal 9 of the detector 11, which terminal is connected to the input terminal 20 of a pre-amplifier 21. The output terminal 22 of this pre-amplifier 21 is connected to the input terminal 23 of a detector 24 whose output terminal 25 is connected to the input terminal 26 of a computer unit 27. Received at the output terminals 28 and 29 of the computer unit 27 are two voltages indicative of the exact position of the mobile target. These two terminals 28 and 29 are the output terminals of the device according to the invention.

In the described embodiment, the mechanical modulator acts to cyclically mask the focussed image of the mobile target. It has for effect to permit or interrupt the heterodyne detection due to the presence of this image on the cell. The output current of the cell is therefore, in its main component, a high-frequency alternating current obtained by heterodyne detection modulated by a low-frequency subcarrier wave which is related to the cyclic movement imparted to the modulator and frequency modulated by the circular translation of the modulator.

It is moreover known how to design the grid so that it is capable of ensuring a null value at the angular threshold of indetermination of the position of the spot focussed onto the sensitive surface of the cell and also capable of ensuring a good protection against noise and giving the quasi-linear measurement of the deviation of the spot and therefore the true angular deviation between the aiming axis of the device and the direction of the target.

The device according to the invention has the improved qualities of high sensitivity resulting from the heterodyne effect of the detection. It will be understood that any other suitable system for modulating the local beam may be employed.

The device according to the invention is of utility in many applications: the simple location of a moving target, a location with automatic aiming, telemetry and remote-control. In all these applications the use of the device according to the invention affords many advantages, the main one of which is high sensitivity due to the gain afforded by the frequency change. It is also very advantageous to be able to obtain by means of the device according to the invention a measurement of the radial velocity of the target jointly with the measurement of the distance of said target.

What we claim is:

1. A device for measuring an angular deviation by a space-time modulated heterodyne detection comprising a coherent optical radiation transmitter pointed at a target, a local transmitter of a coherent optical radiation having the same wavelength as the preceding radiation, a photovoltaic detector, means for focussing at a point on said detector the radiation reflected by the target, and means for converting the radiation of the local transmitter into a beam of parallel rays and causing said beam of parallel rays to impinge perpendicularly on the surface of said detector, wherein the means for space-time modulating the heterodyne detection are interposed in the path of the radiation from the local transmitter.

2. A device according to the claim 1, wherein said space-time modulation is a frequency modulation.

3. A device according to the claim 1, wherein the space-time modulation means are mechanical.

4. A device according to the claim 1, wherein the space-time modulating means comprise means for modulating the transverse modes of the local transmitter.

5. A device according to the claim 3, wherein the modulating means comprise alternately transparent and opaque sectors undergoing a circular movement of translation.

6. A device for measuring an angular deviation by a space-time modulated heterodyne detection comprising a coherent optical radiation transmitter pointed at a target, a local transmitter of a coherent optical radiation having the same wavelength as the preceding radiation, a photovoltaic detector, means for focussing at a point on said detector the radiation reflected by the target, and means for converting the radiation of the local transmitter into a beam of parallel rays and causing said parallel beam to impinge perpendicularly on the surface of said detector, wherein the means for space-time modulating the heterodyne detection are interposed in the path of the radiation from the local transmitter, said space-time modulating means comprising mechanical frequency modulation means for modulating the transverse modes of the local transmitter, said modulating means having alternately transparent and opaque sectors undergoing circular movement of translation.

* * * * *